(12) United States Patent
Kumar et al.

(10) Patent No.: US 11,863,521 B2
(45) Date of Patent: Jan. 2, 2024

(54) HIERARCHICAL PROVISIONING OF NETWORK DEVICES

(71) Applicant: Cisco Technology, Inc., San Jose, CA (US)

(72) Inventors: Rajeev Kumar, Sunnyvale, CA (US); Sanjay Kumar Hooda, Pleasanton, CA (US); Ramesh Chandra Yeevani-Srinivas, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 263 days.

(21) Appl. No.: 17/486,501

(22) Filed: Sep. 27, 2021

(65) Prior Publication Data

US 2023/0100682 A1 Mar. 30, 2023

(51) Int. Cl.
*H04L 61/5014* (2022.01)

(52) U.S. Cl.
CPC .................................. *H04L 61/5014* (2022.05)

(58) Field of Classification Search
CPC .................................................. H04L 61/5014
See application file for complete search history.

(56) References Cited

U.S. PATENT DOCUMENTS

| 2017/0257277 | A1* | 9/2017 | Krithivas | ............ H04L 61/2503 |
| 2018/0069829 | A1 | 3/2018 | Ramasamy et al. | |
| 2018/0337884 | A1 | 11/2018 | Patil | |
| 2020/0137021 | A1* | 4/2020 | Janakiraman | ....... H04L 61/4511 |
| 2020/0162328 | A1* | 5/2020 | Valenza | .............. H04L 41/0886 |
| 2022/0141027 | A1* | 5/2022 | Gaal | ..................... H04L 63/062 |
| | | | | 713/168 |

* cited by examiner

*Primary Examiner* — Suraj M Joshi
(74) *Attorney, Agent, or Firm* — Lee & Hayes, P.C.

(57) ABSTRACT

Automated techniques for converting network devices from a Layer 2 (L2) network into a Layer 3 (L3) network in a hierarchical manner are described herein. The network devices may be configured to boot such that their ports are in an initialization mode in which the ports are unable to transmit locally generated DHCP packets. When a network device detects that a neighbor (or "peer") device has acquired an IP address or has been configured by a network controller, then the port on which the neighbor device is detected can then be transitioned from the initialization mode into a forwarding mode. In the forwarding mode, the port can be used to transmit packets to obtain an IP address. Thus, the network devices are converted from an L2 device to an L3 device in a hierarchical order such that upstream devices are discovered and converted into L3 devices before downstream devices.

20 Claims, 7 Drawing Sheets

HIERARCHICAL PROVISIONING OF NETWORK DEVICES

TECHNICAL FIELD

The present disclosure relates generally to techniques for automating the provisioning of network devices by bringing the network devices in a Layer 2 (L2) network, converting the L2 network into a Layer 3 (L3) network, and pushing configurations to the network devices.

BACKGROUND

Traditionally, installing and deploying networking devices in network deployments has been a manual and time-consuming process. Typically, each network device must initially be pre-staged where a user repetitively copies software images to each device and applies configurations manually through a console connection. Once pre-staged, the network devices are shipped to the network site for installation where a network administrator must troubleshoot, bootstrap, and often modify the configuration. This process can be costly, time-consuming, and prone to errors. Accordingly, users would like to increase the speed and reduce complexity of the deployment without compromising security.

To address these problems, various techniques have been introduced to help automate the provisioning or deployment of network devices. For instance, automate-deployment techniques include the use of software agents that run on the network devices and perform the deployment process for the network device without the need for a network administrator. The automated provisioning or deployment generally includes techniques for the software agents to bring the network devices on into an L2 network (e.g., Data Link Layer network) where the network devices are able to transfer data between each other. Next, the software agents help convert the L2 network of devices into an L3 network, such as by obtaining Internet Protocol (IP) addresses for each of the network devices. After converting into an L3 network, the software agents on the network devices can then work with a centralized controller or server to obtain the configurations for the network devices.

While these automated techniques help reduce the burden on network administrators for deploying networks, various difficulties often arise. For instance, the controller generally has to wait for the entire L3 network to be discovered, and this often requires intervention by a network administrator to indicate when the last network device has been discovered. Additionally, any network device that is brought-up after the network has been discovered generally require human intervention to provision. Further, the conversion from an L2 network to the L3 network is often error prone and requires human intervention.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
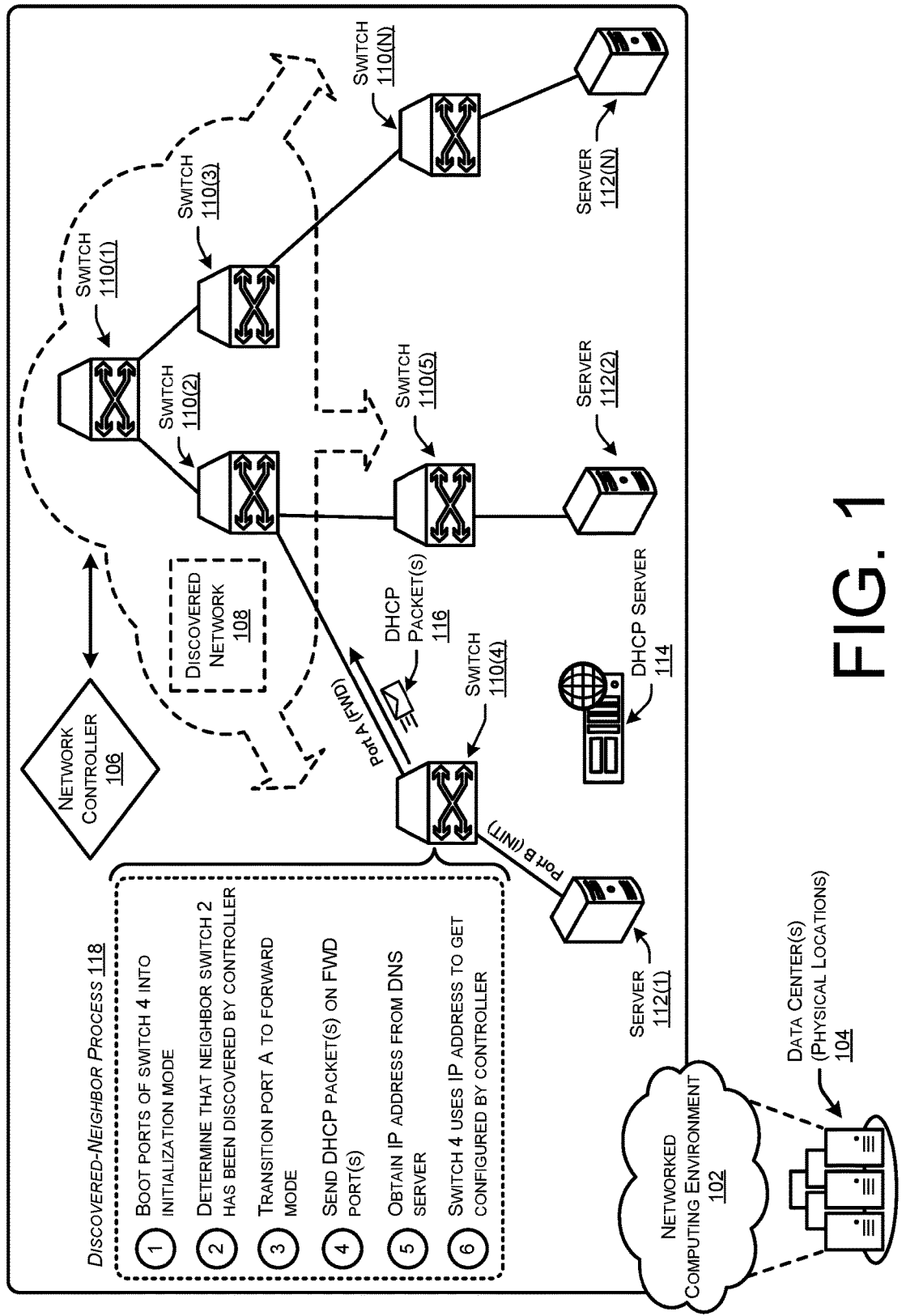
FIG. 1 illustrates a system-architecture diagram of a networked computing environment in which switches are provisioned in an automated fashion and in a hierarchical order.

This disclosure describes techniques for automating the provisioning of network devices by bringing the network devices up into an L2 network, converting the L2 network into an L3 network, and pushing configurations to the network devices. The techniques may include a method for automated device deployment in a hierarchical order in a network of devices. The method may include booting up a first network device and causing ports of the first network device to enter an initialization mode. In the initialization mode, the ports are unable to transmit Dynamic Host Configuration Protocol (DHCP) packets that have been generated locally on the first network device (e.g., CPU generated DHCP packets). The method may further include determining that a second network device has at least one of (i) been given a first Internet Protocol (IP) address or (ii) has been configured by a controller associated with the network. In some instances, the second network device is upstream from the first network device in the network. Further, the method may include causing a first port of the ports to enter a forwarding mode in which the first port is able to transmit DHCP packets to the second network device, and transmitting, from the first network device and using the first port, one or more first DHCP packets to prompt a server to offer the first network device a second IP address. Additionally, the method may include receiving, at the first network device, one or more second DHCP packets that include the second IP address given to the first network device.

In some examples, the method may further include using the second IP address, sending, from the first network device, a request to the controller to be configured, and receiving, at the first network device, configuration data usable to configure the first network device.

Additionally, the techniques described in this disclosure may be performed as a method and/or by a system having non-transitory computer-readable media storing computer-executable instructions that, when executed by one or more processors, performs the techniques described above.

Example Embodiments

This disclosure describes automated techniques for converting network devices from a Layer 2 (L2) network into a Layer 3 (L3) network in a hierarchical manner. The network devices may be configured to boot up in an automated-provisioning program where each port of the network devices is started in an initialization mode in which the ports are unable to transmit locally generated DHCP packets. When a network device detects that a neighbor device, or peer device, has acquired an IP address or has been configured by a network controller, then the port on which the neighbor device is detected can then be transitioned from the initialization mode into a forwarding mode. In the forwarding mode, the port can then be used to transmit DHCP packets in order to obtain an IP address. In this way, the network devices are converted from an L2 device to an L3 device in a hierarchical order such that upstream devices are discovered and converted into L3 devices before downstream devices are discovered and converted.

Generally, network devices that are configured for automated provisioning in a network have software, such as an agent, pre-installed to perform various operations for automating the provisioning of the network devices. The agent may be an embedded software component that is present in the network devices and supports simplified deployment architecture. Traditionally, the software agents may run on the network devices in order to attempt to discover a server with which it can communicate, and once that server is found and a connection established, the software agent performs deployment related activities like configuration, image, license, and file updates by communicating with the server. The server may be a centralized server that encodes the logic of managing and distributing deployment information (images, configurations, files, and licenses) for the devices being deployed. The server communicates with the agent on the network devices that support the simplified deployment process using a specific deployment protocol.

Traditionally, network devices would convert from L2 to L3 by obtaining IP addresses, and then they contact the centralized server (or network controller) to get configured. However, the controller generally needs to wait for the entire network to be discovered to complete configuration of the discovered part of the network. Additionally, new links detected afterwards often require human intervention to get configured by the controller. Thus, there is no solution where a network controller can configure the network devices it discovers (as it discovers them) and not wait for the entire network to be discovered.

According to the techniques of this disclosure, the network devices that are configured with a software agent to perform the automated provisioning techniques may boot up such that all the ports on the devices are in an initialization mode. The initialization mode may be any mode in which the ports are unable to transmit locally generated (or CPU-generated) DHCP packets that are used to obtain IP addresses. Thus, rather than beginning to flood DHCP packets once a device has booted up, the network devices may place their ports in initialization mode and refrain from flooding the network with locally generated DHCP packets. Once the ports are placed in the initialization mode, a timer is started for each of the network devices and/or on each port of the network devices. While the timer is running, the network devices may use Layer 2 discovery protocols to detect neighboring devices (e.g., Link Layer Discovery Protocol (LLDP), Cisco Discovery Protocol (CDP), etc.). If networking devices detect neighbors that have IP addresses and/or have been configured by the network controller, the networking devices may transition those ports from the initialization mode to a forwarding mode and the timer will be stopped on those ports. In the forwarding mode, the ports may be used to flood packets, such as Layer 3 packets including DHCP packets. Additionally, because upstream networking devices are the first devices to be assigned IP addresses and be configured by the controller, the downstream devices will first detect upstream devices and transition those respective ports to forwarding mode.

In some situations, the networking devices may not detect a neighboring device on a port before the timer has expired. In such examples, that may indicate that peer devices on those ports are not configured with the software agent or are otherwise not communicating using a layer 2 discovery protocol. In such examples, the ports for those devices are transitioned from initialization mode into forwarding mode as well.

In further examples, when a neighbor device is detected that can use the L2 discovery protocol, but the neighboring device is not discovered by the controller and/or does not have a IP address, the ports for those "undiscovered" devices are transitioned from the initialization mode into a block mode where locally generated DHCP packets are not transmitted on those blocked ports. Once the neighboring devices have been discovered by the controller and/or provided IP addresses, the ports may be transitioned from the block mode into the forwarding mode such that packets are sent over the ports to the now-discovered peer devices. After the automated provisioning process has been completed for the network devices, the state machines for the ports on the network devices may be destroyed and there are no longer restrictions on forwarding locally generated DHCP packets.

In this way, networks may be deployed and provisioned such that network devices in the networks are brought up and discovered in a layer-by-layer, or hierarchical, manner directly as L3 links with the need for human intervention. As used herein, the term "network devices" may be any type of computing device such as one or more of a switch, a router, a server computer, virtual machine, virtual server, router, gateway, communication node, backend node, load balancer, and the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of a networked computing environment 102 in which switches are provisioned in an automated fashion and in a hierarchical order.

Generally, the networked computing environment 102 may include devices that are housed or located in one or more data centers 104 that may be located at different physical locations. For instance, the networked computing environment 102 may be supported by networks of devices across data centers, in a public cloud computing platform, a private/enterprise computing platform, campus networks, and/or any other type of computing environment in which switches and/or other networking devices are deployed. The one or more data centers 104 may be physical facilities or buildings located across geographic areas that are designated to store networked devices that are part of the networked computing environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked computing environment 102 may not be located in explicitly defined data centers 104 and, rather, may be located in other locations or buildings.

The networked computing environment 102 may be include one or more networks implemented by any viable communication technology, such as wired and/or wireless modalities and/or technologies. The networked computing environment 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The networked computing environment 102 may include devices, virtual resources, or other nodes that relay packets from one network segment to another by nodes in the computer network.

In some examples, the networked computing environment 102 may be managed and/or controlled by a network controller 106. The network controller 106 may comprise software, firmware, and/or hardware components that orchestrate network functions for the networked computing environment 102. The network controller 106 serves as a centralized, programmable point of automation to manage, configure, monitor, and troubleshoot the networked computing environment 102. In the illustrated example, the networked computing environment 102 may have at least a portion of a network being provisioned and/or deployed, such as a branch deployment of a data center 104, a campus network, and/or other deployments. For instance, the networked computing environment 102 may be adding a data center 104 branch and the network controller 106 may be used to help automate the branch deployment.

The networked computing environment 102 may include various types of network devices, such as switches 110(1)-110(N), servers 112(1)-112(N), DHCP server(s) 114, routers, and/or other networking devices (where "N" is any integer greater than 1). The switches 110 may be any of different types of network switches that connect devices in the networked computing environment 102 using packet switching to receive and forward data with other devices (e.g., servers 112).

As shown, the networked computing environment 102 may include network devices that are deployed or provisioned according to a hierarchical manner or order such that upstream devices are discovered and configured prior to downstream devices. As shown, several network devices, specifically, switches 110(1)-110(3), have been discovered (and potentially configured) and are included in a discovered network 108. Thus, the discovered network 108 may grow from upstream devices to downstream devices according to the techniques described herein.

FIG. 1 depicts an example discovered-neighbor process 118 that includes multiple steps for a switch 110(4) to discover the states of neighboring devices, and provision the switch 110(4) in the networked computing environment 102 in a hierarchical manner. As shown, the switch 110(4) may boot up in an automated-provisioning mode where software, such as a software-embedded agent, performs operations for provisioning the switch 110(4).

At "1," the software agent may run on the switch 110(4) and may boot up ports of the switch 4 into an initiation mode. As described herein, a port may generally refer to a communication endpoint. In terms of software, a port may be a logical construct that specifies a process or type of network service. Each port may be identified using a port number according to a transport protocol, which may be Transmission Control Protocol (TCP) and the User Datagram Protocol (UDP). Further, each port number may be associated with an IP address of the switch 110 and a type of transport protocol. Each switch 110 may have multiple ports over which communications with different devices may be performed.

Generally, when ports are in the initialization mode, they are unable to transmit locally generated DHCP packets (e.g., CPU generated). Thus, when all of the ports are booted into the initialization mode, the switches 110 are unable to flood or transmit and locally generated DHCP packets on any of their ports.

At "2," the switch 110(4) may determine that a neighbor switch 110(2) has been discovered by the controller 106 (e.g., is in the discovered network 108). For instance, the switch 110(4) may determine, using an L2 discovery protocol such as LLDP or CDP, that the neighbor switch 110(2) has been discovered. For instance, the L2 neighbor discovery protocol allows devices to advertise device information to their directly connected peers/neighbors. In this way, the switches 110 may advertise various device information to their peers/neighbors, such as an indication of IP addresses, indications that they have been configured, and so forth. Accordingly, at "2" the switch 110(4) may receive data from the neighbor switch 110(2) using a L2 discovery protocol that indicates the switch 110(2) has been discovered and/or configured by the network controller 106.

At "3," the switch 110(4) may transition port A from the initialization mode (INIT) into a forwarding mode (FWD) where the port A is able or allowed to transmit DHCP packets 116 on port A and to the switch 110(2). Thus, locally generated DHCP packets 116 that are generated by the switch 110(4) may be transmitted on port A, which is now in the forward mode (FWD), such that the switch 110(4) is able to attempt to obtain an IP address in order to transition to layer 3.

At "4," the switch 110(4) may send DHCP packets 116 on port A to the switch 110(2) due to the port A being in forward mode such that the DHCP packets 116 would ultimately reach a DHCP server 114 and be provided an IP address. For instance, the DHCP packets 116 may include a DHCPDISCOVER packet as defined by RFC 1541.

At "5," the switch 110(4) may receive an IP address from the DHCP server 114 according to the DHCP standard protocol (RFC 1541) that allows the DHCP server 114 to distribute IP addressing and configuration information to devices in the networked computing environment 102. For instance, the switch 110(4) may receive a DHCPOFFER packet and/or DHCPACK packet according to the DHCP protocol that includes an IP address for the switch 110(4).

At "6," the switch 110(4) may use the IP address to get configured by the network controller 106. For instance, the switch 110(4) may send a request to the network controller 106 for the controller 106 to push down configurations for the switch 110(4). For instance, when the switch 110(4) discovers the network controller 106 and establishes a connection with the network controller 106, the software agent running on the switch 110(4) may perform deployment related activities like configuration, image, license, and file updates by communicating with the controller 106. The network controller 106 may be a centralized server that encodes the logic of managing and distributing deployment information (images, configurations, files, and licenses) for the devices being deployed. The network controller 106 communicates with the agent on the devices that support the simplified deployment process using a specific deployment protocol.

In this way, the switch 110(4) may obtain an IP address and become configured in a hierarchical order such that upstream switches 110(1)-110(3) are discovered and configured before downstream devices such as the switch 110(4).

Figure 2:
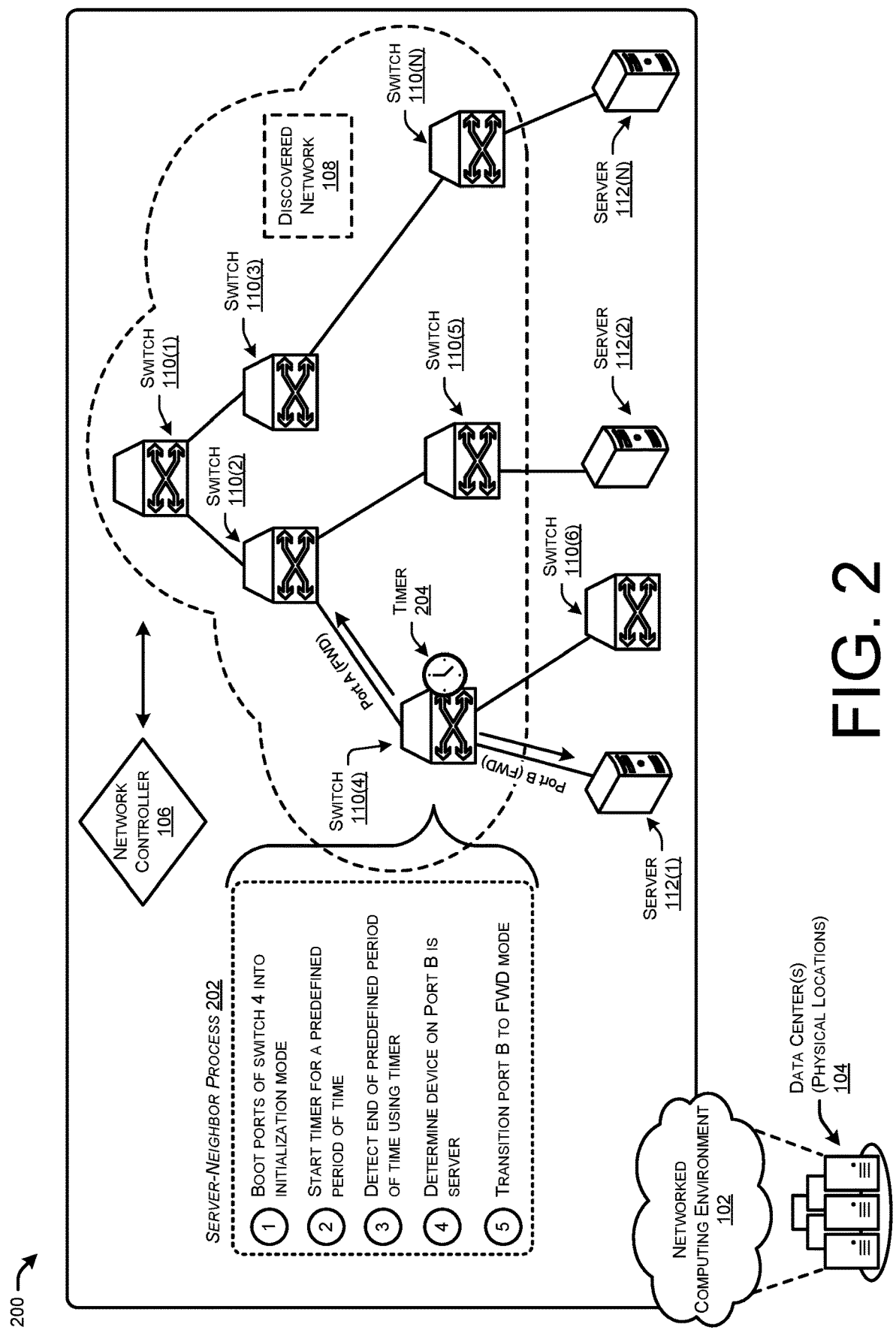
FIG. 2 illustrates a system-architecture diagram of a networked computing environment in which a switch determines that a downstream device is unable to automatically configure itself, and the switch begins forwarding traffic on a port that is connected to the downstream device.

FIG. 2 illustrates a system-architecture diagram 200 of a networked computing environment 102 in which a switch determines that a downstream device is unable to automatically configure itself, and the switch begins forwarding traffic on a port that is connected to the downstream device.

FIG. 2 illustrates a server-neighbor process 202 performed at least partly by the switch 110(4). At "1," the software agent may run on the switch 110(4) and may boot up ports of the switch 4 into an initiation mode. Generally, when ports are in the initialization mode, they are unable to transmit locally generated DHCP packets (e.g., CPU generated). Thus, when all of the ports are booted into the initialization mode, the switches 110 are unable to flood or transmit and locally generated DHCP packets on any of their ports.

At "2," the switch 110(4) may start a timer that expires after a predefined period of time, and/or based on another threshold. For instance, the timer may expire after one or more timeouts for the L2 discovery protocol (e.g., 1 CDP timeout, 5 CDP timeouts, etc.). At "3," the switch 110(4) may detect an end of the predefined period of time using the timer and/or detect a threshold number of CDP timeouts or LLDP timeouts (or other protocol).

At "4," the switch 110(4) may determine that the device on port B of the switch 110(4) is a server 112(1) (or another device that is not configured with the software agent). Generally, the server 112(1) may not have the software agent installed and running thereon, and thus the server 112(1) may not perform the discovery techniques of the switches 110. Therefore, because the server 112(1) has not send any discovery messages for the switch 110(4) to detect, the switch 110(4) determines that the device on port B is a server 112(1) and/or another device that is not configured to perform the discovery techniques described herein.

At "5," the switch 110(4) may transition port B to a forward mode (FWD) based at least in part on determining that the predefined period of time has expired and/or another threshold has been met. In this way, the port B is in forwarding mode such that the switch 110(4) communicates data packets to the server 112(1).

Figure 3A:
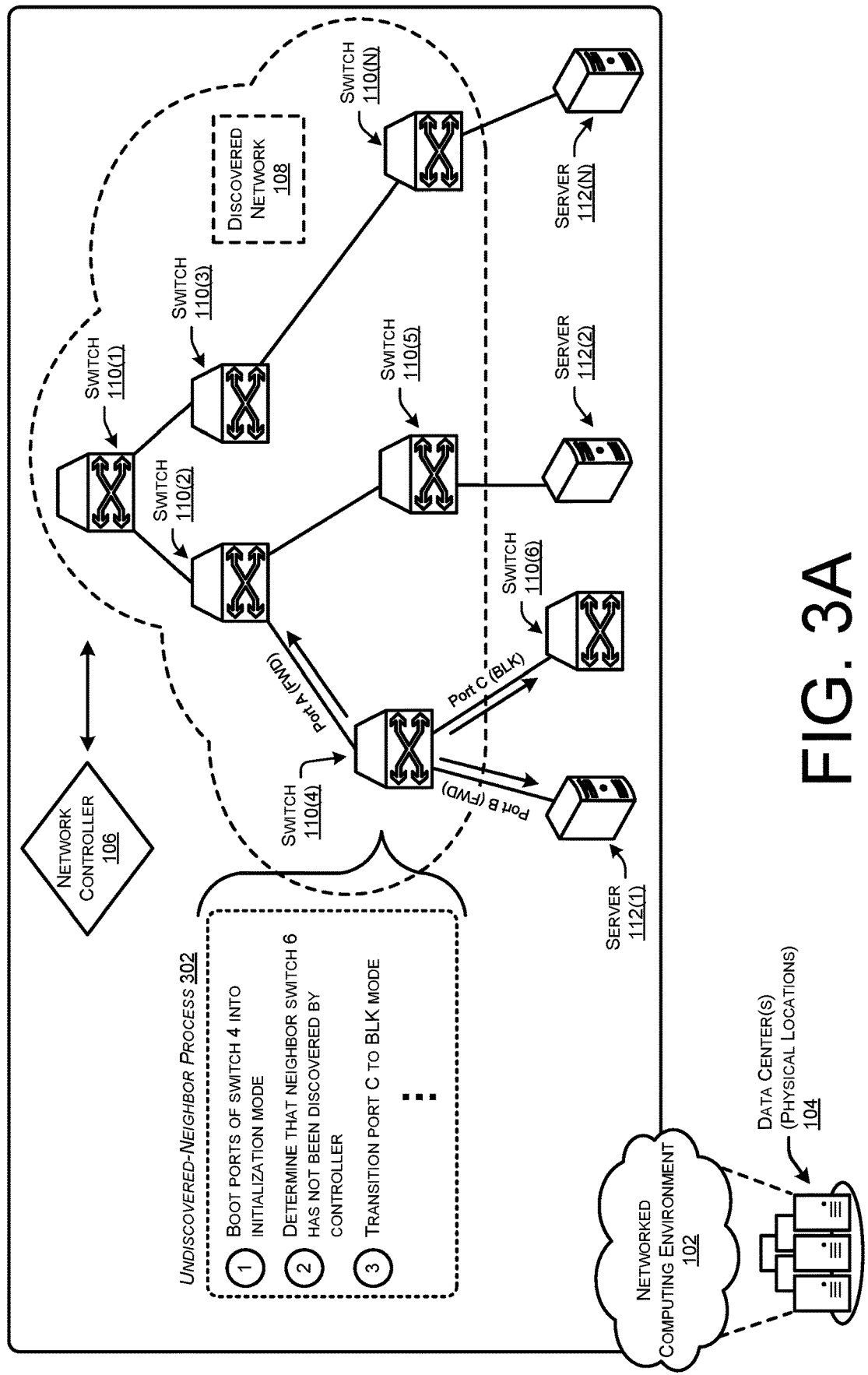
FIGS. 3A and 3B collectively illustrate a system-architecture diagram of an example networked computing environment in which a switch determines that a neighbor device has not been discovered by a controller, and blocking a port associated with that neighbor device. Once the neighbor switch is detected, the switch then transitions the port from being blocked to forwarding mode.
Figure 3B:
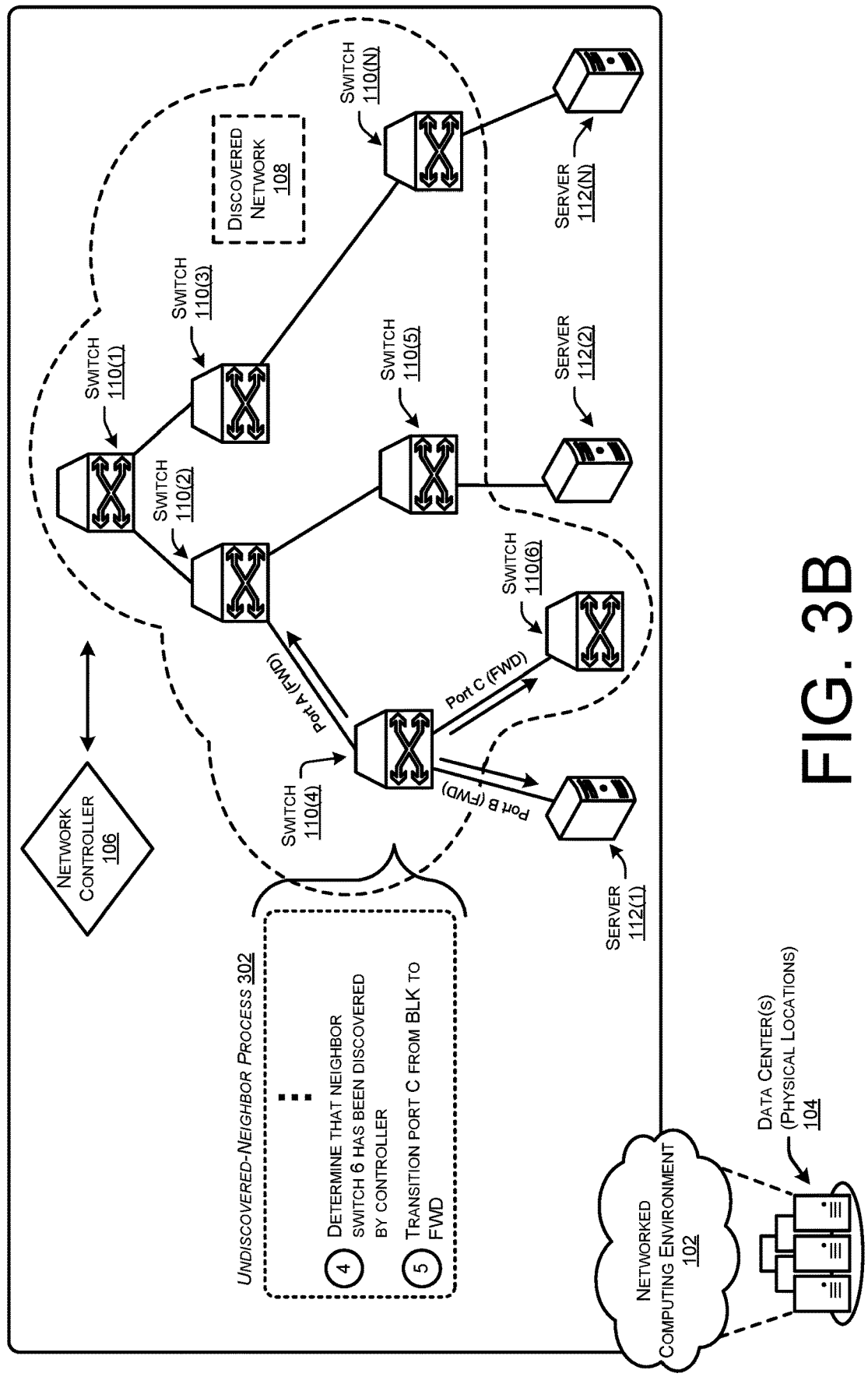

FIGS. 3A and 3B collectively illustrate a system-architecture diagram 300 of an example networked computing environment 102 in which a switch 110(4) determines that a neighbor device has not been discovered by a controller, and blocking a port associated with that neighbor device. Once the neighbor switch is detected, the switch then transitions the port from being blocked to forwarding mode. The switch 110(4) may perform an undiscovered-neighbor process 302 in which the switch 110(4) determines that a neighboring device has not been discovered by the network controller 106.

At "1," the software agent may run on the switch 110(4) and may boot up ports of the switch 4 into an initiation mode. Generally, when ports are in the initialization mode, they are unable to transmit locally generated DHCP packets (e.g., CPU generated). Thus, when all of the ports are booted into the initialization mode, the switches 110 are unable to flood or transmit and locally generated DHCP packets on any of their ports.

At "2," the switch 110(4) may determine that neighbor switch 110(6) has not been discovered by the network controller 106. For instance, the switch 110(4) may determine, using a discovery protocol such as CDP or LLDP, the switch 110(4) may determine that there is no IP address in the discovery messages sent from the switch 110(6).

At "3," the switch 110(4) may transition port C to a block (BLK) mode during which the switch 110(4) is unable to transmit at least locally generated DHCP packets on the port C. In this way, the switch 110(4) may refrain from sending DHCP packets 116 on port B to the switch 110(6) such that downstream switches are configured and discovered in a hierarchical manner.

As shown in FIG. 3B, the switch 110(4) may, at "4," determine that the neighbor switch 110(6) has been discovered. For instance, the switch 110(4) may detect a message, such as a discovery message sent using CDP, LLDP, or another L2 discovery protocol. The discovery message may include an IP address associated with the switch 110(6), and/or another indication that the switch 110(6) has been discovered by the network controller 106 and is in the discovered network 108.

At "5," the switch 110(6) may transition port C from the block mode and into a forward mode such that packets are forwarded or sent to the switch 110(6) on port C of the switch 110(4).

Figure 4:
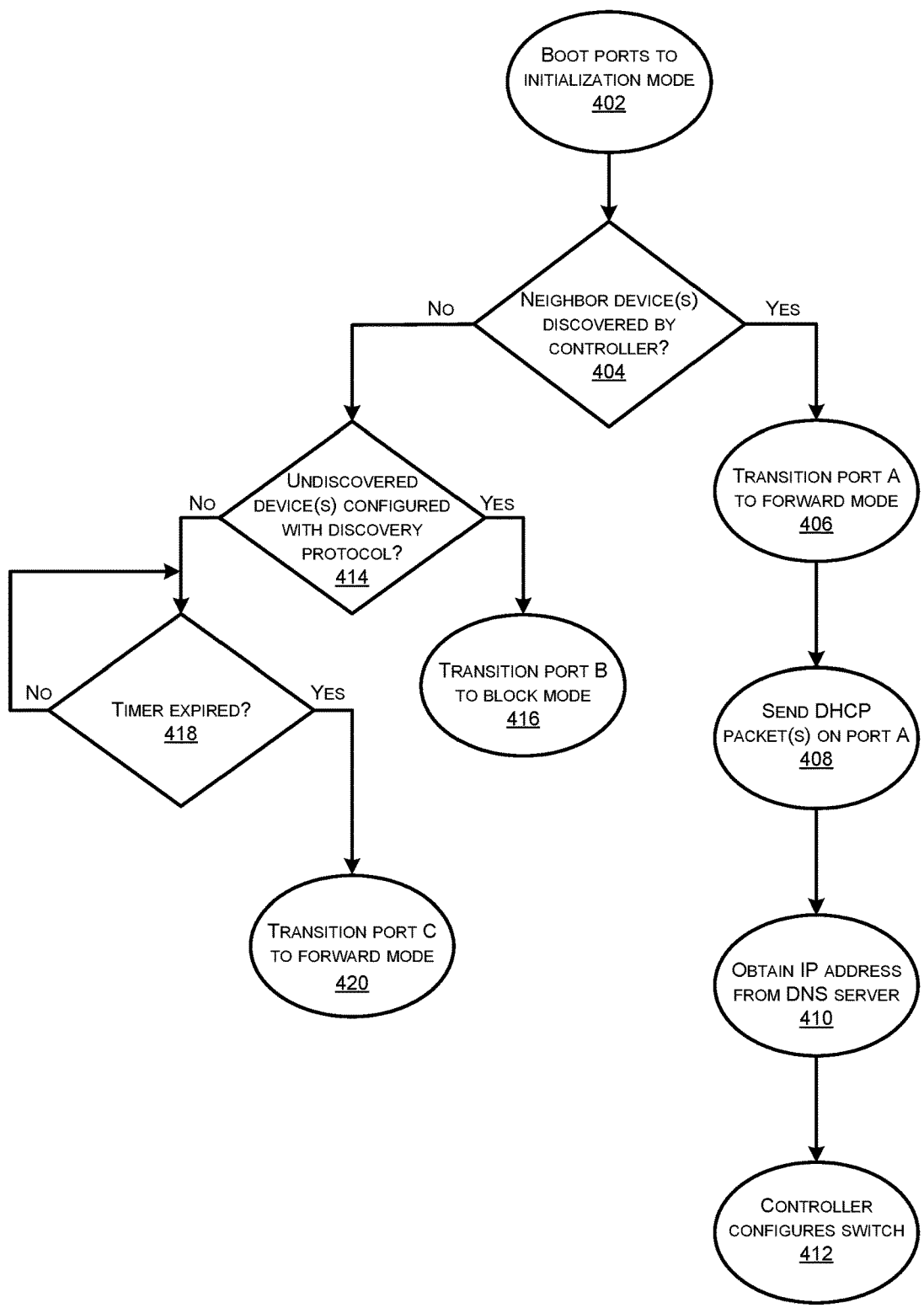
FIG. 4 illustrates an example state diagram showing stages through which a network switch transitions ports between initialization mode, forwarding mode, and/or blocking mode depending on the neighboring device on the respective ports.

FIG. 4 illustrates an example state diagram 400 showing stages through which a network switch 110 transitions ports between initialization mode, forwarding mode, and/or blocking mode depending on the neighboring device on the respective ports.

At 402, the switch 110 may boot up such that the ports are put in an initialization mode. Generally, when ports are in the initialization mode, they are unable to transmit locally generated DHCP packets (e.g., CPU generated). Thus, when all of the ports are booted into the initialization mode, the switches 110 are unable to flood or transmit and locally generated DHCP packets on any of their ports.

At 404, the switch 110 may determine whether or not neighbor/peer devices have been discovered by the network controller 106. For instance, the switch 110 may determine whether IP addresses are included in discovery messages sent by the neighboring devices in L2 discovery messages.

In instances where a neighbor device has been discovered by the controller 106, the switch 110 may, at 406, transition the port(s) on which the discovered device(s) are communicating to forwarding mode such that packets are forward to the discovered neighbor devices. Further, at 408 the switch 110 may send locally generated DHCP packets on ports that are in the forwarding mode and to the discovered devices listening on those ports. At 410, the switch 110 may obtain an IP address from a DHCP server using the DHCP packets and the DHCP protocol. Using the IP address, the switch 110 may, at 412, communicate with the controller 106 (e.g., input IP address in packets) in order to become configured. For instance, the controller may send configuration information to the switch 110 based on the switch 110 having an IP address that is usable by the switch 110 to communicate.

In instances where neighbor device(s) have not been discovered by the network controller 106, the switch 110 may, at 414, may determine whether the undiscovered devices are configured to use the discovery protocol. For instance, the switch 110 may determine whether L2 discovery messages are being sent from the undiscovered devices (e.g., CDP, LLDP, etc.). In such examples, the switch may, at 416, transition the port on which undiscovered devices that can use the L2 discovery protocol to block mode such that locally generated DHCP packets 116 are not transmitted on those ports to the undiscovered devices. Once the devices become discovered and the IP address is in the header of the discovery messages, the switch 110 may then transition the blocked ports back to forward mode.

However, if the switch 110 determines at 414 that the undiscovered devices are not configured with the discovery protocol or does not use the discovery protocol, the switch 110 may determine whether the timer has expired at 418. The timer may have been started when the ports are started in initialization mode, and if the timer expires, then the switch 110 may transition the ports from initialization mode into forwarding mode at 420.

Figure 5:
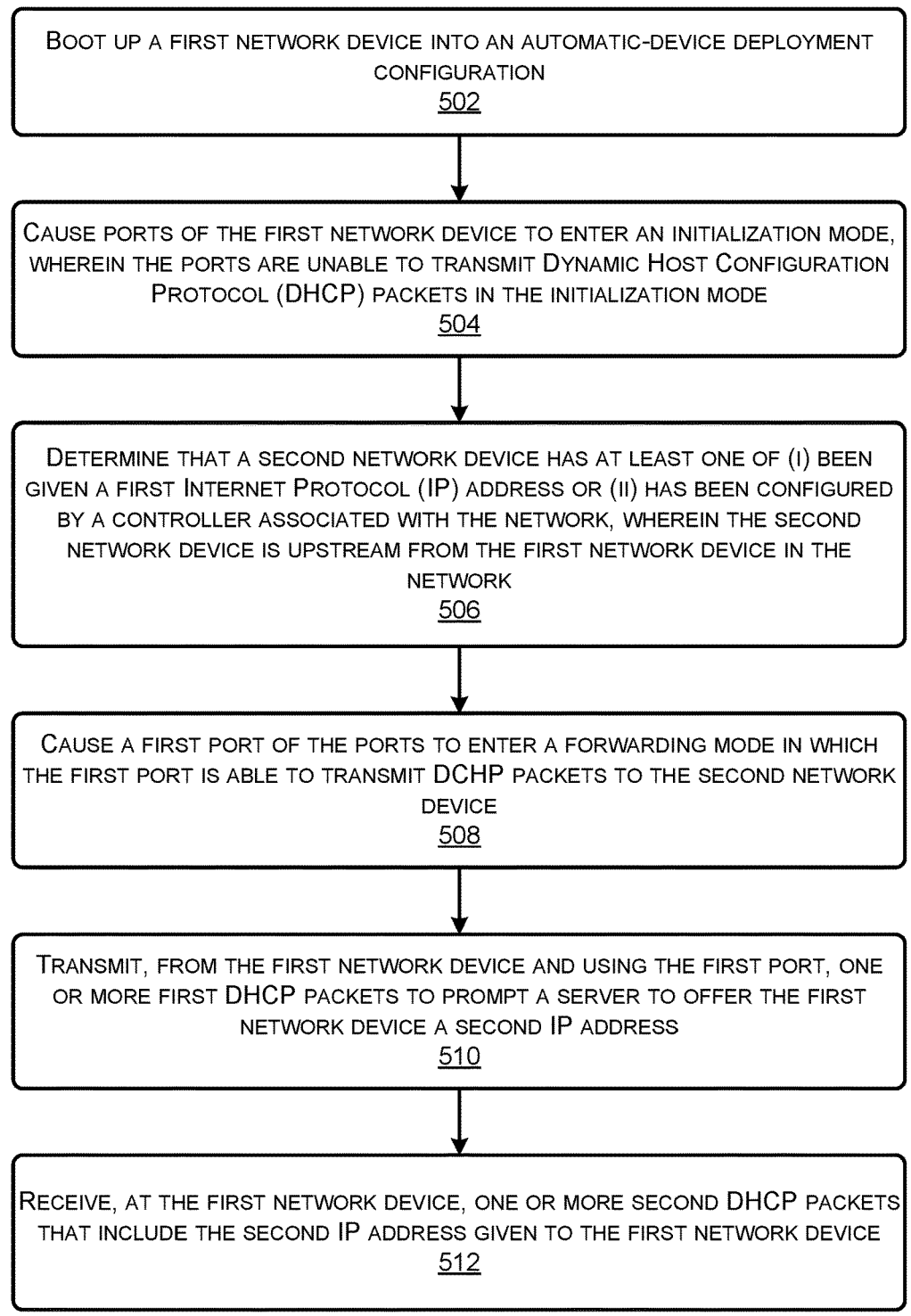
FIG. 5 illustrates a flow diagram of an example method for transitioning ports through modes based on the states of neighboring devices such that a network is discovered in a hierarchical order.

FIG. 5 illustrates a flow diagram of example methods that illustrate various aspects of the techniques of this disclosure. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for transitioning ports through modes based on the states of neighboring devices such that a network is discovered in a hierarchical order. In some instances, the method 500 may be included in automated device deployment techniques performed in a hierarchical order in a network of devices.

At 502, a first network device may be booted up for provisioning or deployment in a network. The first network device may be a switch 110 and/or any other type of network device that is capable of automated provisioning in a network. The first network device may run a software agent that performs at least some techniques for automated provisioning.

At 504, the first network device may cause ports to enter an initialization mode. Generally, in the initialization mode the ports are unable to transmit locally generated Dynamic Host Configuration Protocol (DHCP) packets.

At 506, the first network device may determine that a second network device has at least one of (i) been given a first Internet Protocol (IP) address or (ii) has been configured by a controller associated with the network. In some examples, the second network device is upstream from the first network device in the network. For instance, the first network device may determine whether packets sent by the second network device include an IP address (e.g., management IP address).

At 508, the first network device may cause a first port of the ports to enter a forwarding mode in which the first port is able to transmit DHCP packets to the second network device. At 510, the first network device may transmit, using the first port, one or more first DHCP packets to prompt a server to offer the first network device a second IP address. At 512, the first network device may receive one or more second DHCP packets that include the second IP address given to the first network device. In some instances, the method 500 may further include using the IP address to send packets to a controller 106 to be configured according to configurations for the network.

Figure 6:
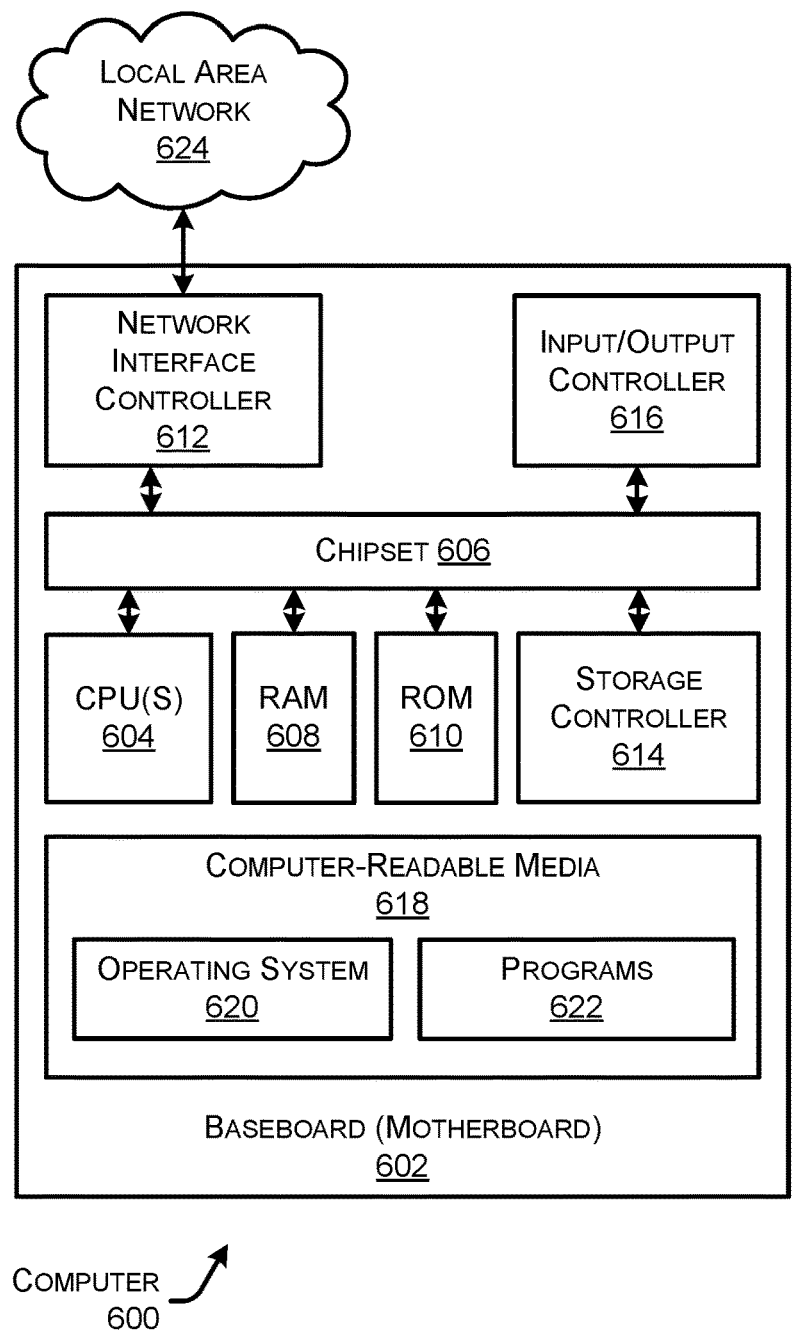
FIG. 6 illustrates a computer architecture diagram showing an example computer hardware architecture for implementing a computing device that can be utilized to implement aspects of the various technologies presented herein.

FIG. 6 illustrates a computer architecture diagram showing an example computer hardware architecture 600 for implementing a computing device that can be utilized to implement aspects of the various technologies presented herein. The computer hardware architecture 600 shown in FIG. 6 illustrates a switch (e.g., switch 110) conventional server computer (e.g., server 112), computing resource, network device (e.g., router, load balancer, data store, etc.), workstation, desktop computer, laptop, tablet, network appliance, e-reader, smartphone, or other computing device, and can be utilized to execute any of the software components presented herein. The computer 600 may, in some examples, correspond to a network device described herein, and may comprise networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as a network 624. The chipset 606 can include functionality for providing network connectivity through a Network Interface Controller (NIC) 612, such as a gigabit Ethernet adapter. The NIC 612 is capable of connecting the computer 600 to other computing devices over a network. It should be appreciated that multiple NICs 612 can be present in the computer 600, connecting the computer to other types of networks and remote computer systems. In some examples, the NIC 612 may be configured to perform at least some of the techniques described herein, such as packet redirects and/or other techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the switches 110 and or any components included therein, may be supported by one or more devices similar to computer 600. Stated otherwise, some or all of the operations performed by the switches 110, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a switch 110 or another network device (e.g., server computer, computing resource, router, etc.). The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the switches 110, servers 112, DHCP server 114, network controller 106, etc. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for automated device deployment in a hierarchical order in a network of devices, the method comprising:
    booting up a first network device;
    causing ports of the first network device to enter an initialization mode, wherein the ports are unable to transmit locally generated Dynamic Host Configuration Protocol (DHCP) packets in the initialization mode;
    determining that a second network device has at least one of (i) been given a first Internet Protocol (IP) address or (ii) has been configured by a controller associated with the network, wherein the second network device is upstream from the first network device in the network;
    causing a first port of the ports to enter a forwarding mode in which the first port is able to transmit DHCP packets to the second network device;
    transmitting, from the first network device and using the first port, one or more first DHCP packets to prompt a server to offer the first network device a second IP address; and
    receiving, at the first network device, one or more second DHCP packets that include the second IP address given to the first network device.

2. The method of claim 1, further comprising:
    using the second IP address, sending, from the first network device, a request to the controller to be configured; and
    receiving, at the first network device, configuration data usable to configure the first network device.

3. The method of claim 2, wherein the first network device is booted up into an automatic-device deployment configuration, further comprising, based on being configured using the configuration data, transitioning from the automatic-device deployment configuration into a default-run configuration.

4. The method of claim 1, further comprising:
    subsequent to causing the ports to enter into the initialization mode, setting a timer for a period of time; and
    based at least in part on an end of the period of time, transitioning a second port of the ports from the initialization mode into the forwarding mode.

5. The method of claim 1, further comprising:
    detecting, using a layer-2 (L2) discovery protocol and via a second port of the ports, a third network device;
    determining that the third network device does not have a respective IP address or has not been configured by the controller; and
    causing the second port to enter a block mode in which the second port is unable to transmit DHCP packets to the third network device.

6. The method of claim 5, further comprising:
    detecting, via the second port, an L2 discovery message transmitted from the third network device; and
    causing the second port to enter the forwarding mode in which the second port is usable to transmit packets to the third network device.

7. The method of claim 1, wherein:
    the network comprises a local area network (LAN);
    the first network device comprises a first switch in the LAN; and
    the second network device comprises a second switch that is upstream from the first switch in the LAN.

8. A first network device comprising:
    one or more processors; and
    one or more non-transitory computer-readable media storing instructions that, when executed by the one or more processors, cause the one or more processors to perform operations comprising:
        causing ports of the first network device to enter an initialization mode, wherein the ports are unable to transmit locally generated Dynamic Host Configuration Protocol (DHCP) packets in the initialization mode;
        determining that a second network device has at least one of (i) been given a first Internet Protocol (IP) address or (ii) has been configured by a controller associated with a network in which the first network device and second network device are located, wherein the second network device is upstream from the first network device in the network;
        causing a first port of the ports to enter a forwarding mode in which the first port is able to transmit DHCP packets to the second network device;
        transmitting, from the first network device and using the first port, one or more first DHCP packets to prompt a server to offer the first network device a second IP address; and
        receiving, at the first network device, one or more second DHCP packets that include the second IP address given to the first network device.

9. The first network device of claim 8, the operations further comprising:
    using the second IP address, sending, from the first network device, a request to the controller to be configured; and
    receiving, at the first network device, configuration data usable to configure the first network device.

10. The first network device of claim 9, wherein the first network device is booted up into an automatic-device deployment configuration, the operations further comprising, based on being configured using the configuration data, transitioning from the automatic-device deployment configuration into a default-run configuration.

11. The first network device of claim 8, the operations further comprising:
   subsequent to causing the ports to enter into the initialization mode, setting a timer for a period of time; and
   based at least in part on an end of the period of time, transitioning a second port of the ports from the initialization mode into the forwarding mode.

12. The first network device of claim 8, the operations further comprising:
   detecting, using a layer-2 (L2) discovery protocol and via a second port of the ports, a third network device;
   determining that the third network device does not have a respective IP address or has not been configured by the controller; and
   causing the second port to enter a block mode in which the second port is unable to transmit DHCP packets to the third network device.

13. The first network device of claim 12, the operations further comprising:
   detecting, via the second port, an L2 discovery message transmitted from the third network device; and
   causing the second port to enter the forwarding mode in which the second port is usable to transmit packets to the third network device.

14. The first network device of claim 8, wherein:
   the network comprises a local area network (LAN);
   the first network device comprises a first switch in the LAN; and
   the second network device comprises a second switch that is upstream from the first switch in the LAN.

15. One or more non-transitory computer-readable media storing computer-executable instructions that, when executed by one or more processors, cause the one or more processors to perform operations comprising:
   causing ports of a first network device to enter an initialization mode, wherein the ports are unable to transmit locally generated Dynamic Host Configuration Protocol (DHCP) packets in the initialization mode;
   determining that a second network device has at least one of (i) been given a first Internet Protocol (IP) address or (ii) has been configured by a controller associated with a network in which the first network device and second network device are located, wherein the second network device is upstream from the first network device in the network;
   causing a first port of the ports to enter a forwarding mode in which the first port is able to transmit DHCP packets to the second network device;
   transmitting, from the first network device and using the first port, one or more first DHCP packets to prompt a server to offer the first network device a second IP address; and
   receiving, at the first network device, one or more second DHCP packets that include the second IP address given to the first network device.

16. The one or more non-transitory computer-readable media of claim 15, the operations further comprising:
   using the second IP address, sending, from the first network device, a request to the controller to be configured; and
   receiving, at the first network device, configuration data usable to configure the first network device.

17. The one or more non-transitory computer-readable media of claim 16, wherein the first network device is booted up into an automatic-device deployment configuration, the operations further comprising, based on being configured using the configuration data, transitioning from the automatic-device deployment configuration into a default-run configuration.

18. The one or more non-transitory computer-readable media of claim 15, the operations further comprising:
   subsequent to causing the ports to enter into the initialization mode, setting a timer for a period of time; and
   based at least in part on an end of the period of time, transitioning a second port of the ports from the initialization mode into the forwarding mode.

19. The one or more non-transitory computer-readable media of claim 15, the operations further comprising:
   detecting, using a layer-2 (L2) discovery protocol and via a second port of the ports, a third network device;
   determining that the third network device does not have a respective IP address or has not been configured by the controller; and
   causing the second port to enter a block mode in which the second port is unable to transmit DHCP packets to the third network device.

20. The one or more non-transitory computer-readable media of claim 19, the operations further comprising:
   detecting, via the second port, an L2 discovery message transmitted from the third network device; and
   causing the second port to enter the forwarding mode in which the second port is usable to transmit packets to the third network device.

\* \* \* \* \*